United States Patent [19]
Di Stefano et al.

[11] Patent Number: 5,233,355
[45] Date of Patent: Aug. 3, 1993

[54] POSITION TRANSDUCER

[75] Inventors: Luca Di Stefano; Domenico Peiretti, both of Turin; Francesco Sgandurra, Rivalta, all of Italy

[73] Assignee: Prima Electronics S.p.A., Turin, Italy

[21] Appl. No.: 669,759

[22] Filed: Mar. 15, 1991

[30] Foreign Application Priority Data

Mar. 16, 1990 [IT] Italy .................. 67194 A/90

[51] Int. Cl.⁵ .............................. G08C 19/12
[52] U.S. Cl. .................. 341/187; 340/870.28; 340/870.29
[58] Field of Search .......... 341/187; 340/870.28, 340/870.29, 870.31

[56] References Cited

U.S. PATENT DOCUMENTS

| | | | |
|---|---|---|---|
| 4,014,015 | 3/1977 | Gundlach | 340/870.31 |
| 4,305,072 | 12/1981 | Makita | 340/870.31 |
| 4,587,485 | 5/1986 | Papiernik | 340/870.31 |
| 4,608,714 | 8/1986 | Juengel | 340/870.28 |
| 4,748,447 | 5/1988 | Oshizawa | 340/870.31 |
| 4,855,734 | 8/1989 | Elsdoerfer | 340/870.31 |
| 4,942,394 | 7/1990 | Gasiunas | 340/825.31 |

FOREIGN PATENT DOCUMENTS

| | | |
|---|---|---|
| 0125413 | 11/1984 | European Pat. Off. . |
| 0341314 | 11/1989 | European Pat. Off. . |
| 2065872 | 7/1981 | United Kingdom . |
| 89/03976 | 5/1989 | World Int. Prop. O. .......... 341/187 |

OTHER PUBLICATIONS

Radio Shack "Understanding Data Communications" 1984 pp. 2-18 through 2-19.

*Primary Examiner*—Donald J. Yusko
*Assistant Examiner*—Brian Zimmerman
*Attorney, Agent, or Firm*—Gifford, Groh, Sprinkle, Patmore and Anderson

[57] ABSTRACT

An absolute position transducer (encoder) comprising an incremental encoder having a coded disk connected stably to a shaft, and connected to a sensor for emitting a signal for each complete turn of the disk The incremental encoder produces a first and second signal, each consisting of a sequence of pulses in which each pulse equals one elementary angular increment of the shaft, and a third signal (ZERO) consisting of a sequence of zero pulses, each emitted for each complete turn of the shaft. The absolute encoder comprises a resettable counter for counting the signal emitted by the sensor and memorizing the number of turns of the shaft in a permanent memory; and a control circuit enabled by a zero pulse generated by the incremental encoder, and cooperating with a coding circuit for emitting a coded dummy zero pulse in such a manner that, in the interval between the zero and dummy zero pulses, the first or second signal supplies a decoding circuit with a number of pulses equal to the number stored in the memory of the count circuit.

14 Claims, 7 Drawing Sheets

POSITION TRANSDUCER

BACKGROUND OF THE INVENTION

The present invention relates to a position transducer. With robots or numerical control machines, it is essential to know, at all times, the absolute position of each mobile element according to at least one respective degree of freedom (axis).

This is normally achieved using incremental position transducers (encoders), which are position, conveniently angular position, sensors that supply two signals for measuring the direction and rotation angle of a rotary shaft. The information supplied by the encoders is coded in the form of a sequence of pulses equal to the number of elementary increments of the rotary shaft.

The pulse sequences are transmitted via two signals with a 90° phase lead or delay depending on the rotation direction of the encoder shaft. The actual position of the rotary shaft is determined by a measuring device which decodes the pulses supplied by the encoder. The measurement relates to the starting position of the shaft, and therefore requires a further reference for obtaining absolute information. A third pulse is therefore emitted by the encoder when a reference position, known as the zero position of the shaft, is reached. In this way, if a counter for measuring the signals from the encoder is reset by the zero pulse, the information supplied by the encoder is rendered absolute within one turn of the shaft.

In the case of rotary shafts involving a large number of turns (e.g. drive shafts with reduction gears, winders, etc..), provision must be made for a position sensor capable of determining which turn of the encoder relates to the zero reference angle and, therefore, which zero pulse the counter is to be reset by.

When the machine equipped with the encoder is started up, the transducer shaft must therefore be set to a predetermined zero position for resetting the counter, to do which, the mechanical assembly connected to the encoder shaft must be set to a position corresponding to the zero position of the encoder.

This is a time-consuming operation for which no information is available concerning the position of the moving parts of the machine.

What is more, in the case of complex systems, such as multiple-axis robots, operation is seriously impaired due to the downtime involved in setting up the machine, and the safety hazards posed by working on the machine with the position control deactivated.

Absolute, e.g. multirotation, encoders exist which supply absolute position information covering the entire travel of the shaft, which information is maintained even when supply to the encoders is cut off. Such devices, however, are of fairly complex mechanical design and expensive to produce.

SUMMARY OF THE INVENTION

The aim or the present invention is to provide an absolute position transducer (encoder) enabling straightforward, low-cost production comparable with that of an incremental encoder.

With this aim in view, according to the present invention, there is provided a position transducer comprising an incremental encoder having a coded disk connected stably to a rotary shaft; said incremental encoder supplying at least three output signals: a first signal consisting of a sequence of pulses equal to an elementary angular increment of said shaft; a second signal similar to and out of phase in relation to said first signal, for transmitting information relative to the direction of rotation of said shaft; and a third signal consisting of a sequence of zero pulses, each emitted for each 360° rotation of said disk; each of said first, second and third signals being transmitted over a respective first, second and third line; characterised by the fact that it comprises sensor means connected to said incremental encoder for emitting a fourth signal for each complete turn of said coded disk; resettable counter means for counting said fourth signal emitted by said sensor means and memorising the number of turns of said disk in a permanent memory; and first electronic mean enabled by the first of said zero pulses generated by said incremental encoder, said first electronic means cooperating with second electronic means for transmitting in coded manner, to means for receiving the position information of said transducer, the information relative to the number of turns contained in said memory.

BRIEF DESCRIPTION OF THE DRAWINGS

A number of non-limiting embodiments of the present invention will be described by way of example with reference to the accompanying drawings, in which.

DETAILED DESCRIPTION OF THE INVENTION

Figure 1:
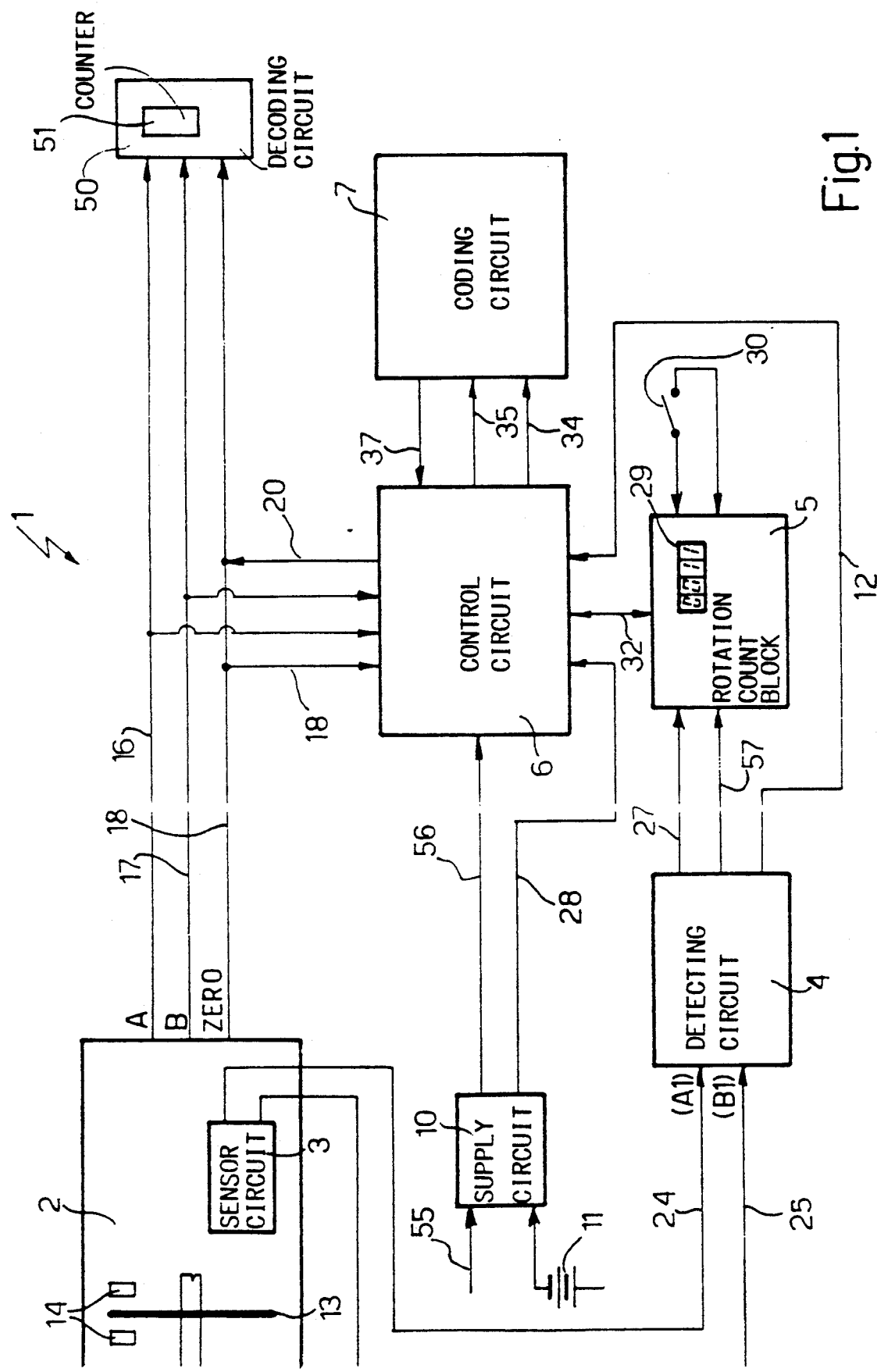
FIG. 1 shows a block diagram of an absolute position transducer (encoder) in accordance with the teachings of the present invention.

Number 1 in FIG. 1 indicates an absolute position transducer (encoder) comprising an incremental encoder 2 to which is connected a sensor circuit 3 connected to the input of a detecting circuit 4. The output of detecting circuit 4 is connected to a rotation count block 5 interacting, as described later, with a control circuit 6 connected to a coding circuit 7. A supply circuit 10, connected in customary manner (not shown) to the various blocks of encoder 1, is connected to an external supply mains 55, and presents a buffer battery 11 for ensuring supply to parts of encoder 1, in particular rotation count block 5, even in the event of a power failure. As described later, circuit 10 also provides for controlling supply, and is connected by lines 56 and 28 to control circuit 6.

Incremental encoder 2, which is a substantially known type, presents a coded disk 13 connected integral with a shaft 15 the angular position of which requires precision measurement, and is connected in customary manner to optoelectronic means 14 for emitting three output signals over respective lines 16, 17 and 18 indicated respectively A, B and Zero. The signals along lines 16 and 17 consist of two sequences of pulses (normally square waves) with a 90° phase lead or delay depending on the direction of rotation of shaft 15. Each pulse is equal to an elementary angular increment of shaft 15. The signal along line 18 indicates 360° rotation of shaft 15, and consists of a sequence of pulses, herein-after referred to as "zero pulses", each emitted for each complete turn of shaft 15.

Line 18 is connected to control block 6, which presents an output line 20 connected, together with lines 16 and 17, to the input of a decoding circuit 50 described in detail later on.

Disk 13 is also connected to sensor 3, which emits an output pulse for each turn of shaft 15 over lines 24 and 25 indicated respectively A1 and B1. The pulses on lines 24 and 25 are slightly out of phase, for indicating the direction of rotation of shaft 15. As described in detail later, sensor 3 is constantly enabled by circuit 10 and must therefore absorb very little current. Sensor 3 may conveniently consist, for example, of a Hall-effect sensor, a magnetic switch (REED), or a capacitive sensor.

Lines 24 and 25 are connected to circuit 4, which provides for amplifying and clipping the signals generated by sensor 3. Circuit 4 also processes the signals on lines 24 and 25, and supplies rotation count block 5 (comprising a counter) with a series of directional count pulses relative to rotation of disc 13 over lines 27 and 57 respectively transmitting said pulses and the count direction (UP/DOWN). Circuit 4 is also connected to control circuit 6 by an alarm line 12.

Rotation count block 5 presents a memory 29 in which the pulse count from line 27 is recorded, and which thus provides for storing the number (corresponding to a position) of complete turns of shaft 15. The data stored in memory 29 is preserved even in the event of a power cut, in which case, memory 29 is conveniently supplied by battery 11 connected to block 10. Rotation count block 5 also presents a key 30 for resetting memory 29 when calibrating encoder 1. The content of memory 29 is supplied to control circuit 6 over line 32, for the purpose described in detail later on.

The output of control circuit 6 is connected over lines 34 and 35 to coding circuit 7, which supplies control circuit 6 with a coded (MATCH) signal over line 37. In use, shaft 15 of incremental encoder 2 is normally connected via a drive (not shown) to an element (axis) normally sliding along a machine slideway and the position of which is determined via a rotation count of shaft 15. When calibrating encoder 1, the axis is set to a zero start position from which the number of turns of shaft 15 is to be counted, and in which memory 29 of rotation count block 5 is reset by key 30.

As shaft 15 rotates, rotation count block 5 counts the pulses supplied by detecting block 4 over lines 27 and 57, according to the direction of rotation of shaft 15, and updates the content of memory 29. Memory 29 therefore contains at all times a value indicating the number of turns effected by shaft 15 as of the zero position, which information is preserved even in the event of supply being cut off to the machine to which encoder 1 is connected.

According to the present invention, when the machine is turned on again, the information contained in memory 29 is transmitted to decoding circuit 50 over lines 20, 16 and 17, with no initial reset procedure required. When the machine is turned on, the axis is moved until the first zero pulse over line 18 enables controller circuit 6 and provides for automatically requalifying the axis position.

Figure 4:
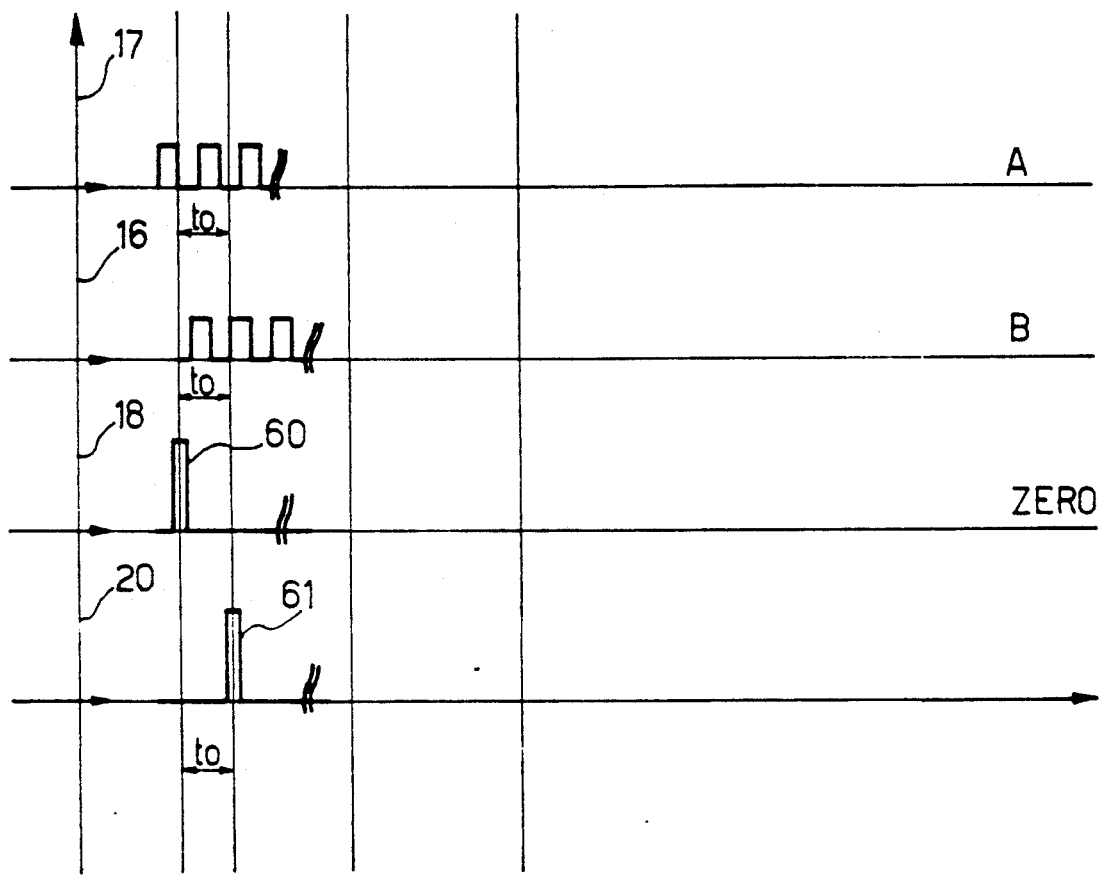
FIG. 4 shows a time graph of a number of signals produced by the FIG. 1 encoder.

With reference to FIG. 4, when the machine is turned on, thus enabling control circuit 6 over line 56, and a zero pulse (60) is received by controller circuit 6 over line 18, controller circuit 6, over line 32, provides for reading the value contained in memory 29 and indicating the number of turns effected by shaft 15 as of the zero start position.

This value is sent by control circuit 6 to coding circuit 7, which emits a second so-called "dummy zero" pulse (61) separated from the real zero pulse by a time interval TO during which (n) pulses equal to the number (n) stored in memory 29, and equal to 1 in the FIG. 4 example, are transmitted over line 16 or 17. The information stored in memory 29 is thus transmitted to decoding circuit 50 using the normal pulses over lines 16 and 17, with no additional data line required.

Figure 5:
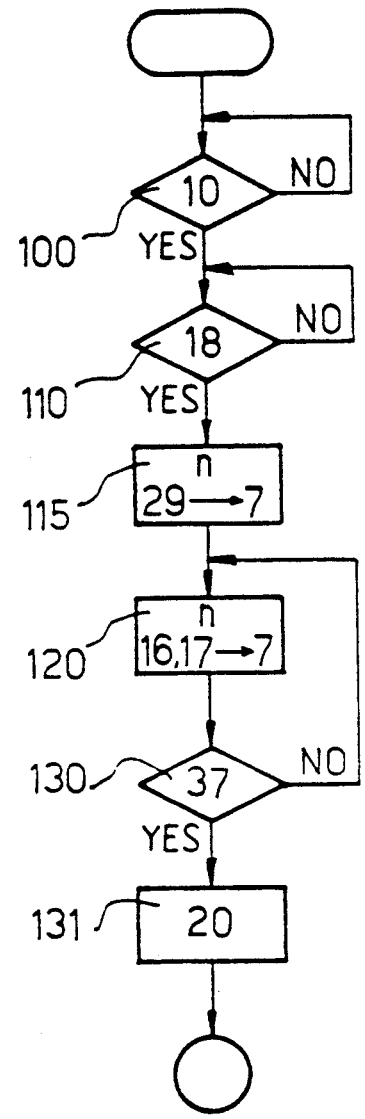

Control circuit 6 operates as shown in the FIG. 5 block diagram. This presents a start block 100, which determines whether power has been supplied to the whole of encoder 1. If it has not, control circuit 6 performs a wait cycle. If it has, this is detected by a signal over line 56.

Block 100 then goes on to wait block 110, which waits for and recognizes a zero pulse over line 18. When the first zero pulse is received by circuit 6, block 110 goes on to block 115, which provides for reading the content (n) of memory 29 and supplying it to coding circuit 7 over line 34. Block 115 then goes on to block 120, which provides for detecting the pulses over line 16 or 17 and supplying them to circuit 7 over line 35. When the (n)th pulse over line 35 is found by circuit 7 to match the number stored in memory 29 and supplied to circuit 7 over line 34, circuit 7 supplies a MATCH signal over line 37 to block 6. Said MATCH signal is detected by block 130, which therefore goes straight to block 131 for emitting an end-of-transmission (dummy zero) signal, which is sent by control circuit 6 on to line 20 and also provides for disabling circuit 6. Thus, between the zero pulse and dummy zero pulse on line 16 or 17, (n) pulses have actually been transmitted.

Decoding circuit 50 provides for an exact interpretation of the real zero and dummy zero pulses. In particular, circuit 50 counts the n pulses transmitted over line 16 or 17 between the real zero and dummy zero pulses, and reconstructs the total number of pulses indicating the exact measurement in relation to the zero reference position according to the formula:

$$Ntot = n*N + n \quad (1)$$

where N is the number of pulses transmitted over line 16 or 17 during one complete turn of disk 13.

Figure 6:
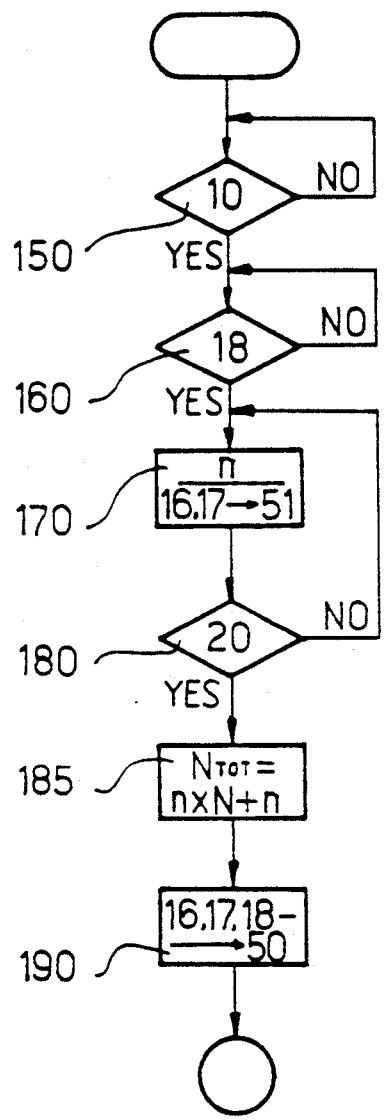
FIGS. 5 to 10 show operating logic block diagrams of a number of blocks in FIGS. 1, 2 and 3.

FIG. 6 shows an operating logic block diagram of decoding circuit 50. This presents a start block 150, which waits for a signal indicating that encoder 1 has been turned on. When this occurs, block 150 goes on to block 160, which waits for a zero signal over line 18. When this is detected, block 160 goes on to block 170, which enables counter 51 for counting the pulses supplied by incremental encoder 2 over line 16 or 17. Block 170 then goes on to block 180, which determines whether a zero pulse is supplied over line 18 subsequent to that detected by block 160. When this occurs, block 180 goes on to block 185, which stops the pulse count relative to line 16 or 17 (the count number is indicated by (n)), and provides for reconstructing the total number of pulses which would have been counted between the mechanical reference position and the position in which the dummy zero pulse is received, according to the formula:

$$Ntot = n*N + n \quad (1).$$

Finally, block 185 goes on to block 190 which, as of value Ntot, provides for enabling operation of encoder 1 in the same way as a normal incremental encoder, whereby the signals supplied by incremental encoder 2 over lines 16, 17 and 18 are supplied to decoding circuit 50, which operates in conventional manner as regards the conventional downstream circuits to which it is connected.

Absolute encoder 1 also presents means for detecting faults which may impair position measuring accuracy. In particular, detecting block 4 comprises a circuit for detecting error conditions (e.g. absence of either input signal, illegal transitions, etc.) and supplying control circuit 6 with an error signal over line 12. Control circuit 6 in turn supplies a special signal over line 20, which is identified by decoding circuit 50 which accordingly informs the operator.

Supply circuit 10 also comprises a detecting circuit for checking the charge of battery 11. When this falls below a predetermined threshold value, circuit 10 supplies an error signal over line 28 to control circuit 6, which supplies a special signal over line 20. This is identified by decoding circuit 50 which accordingly informs the operator.

Figure 2:
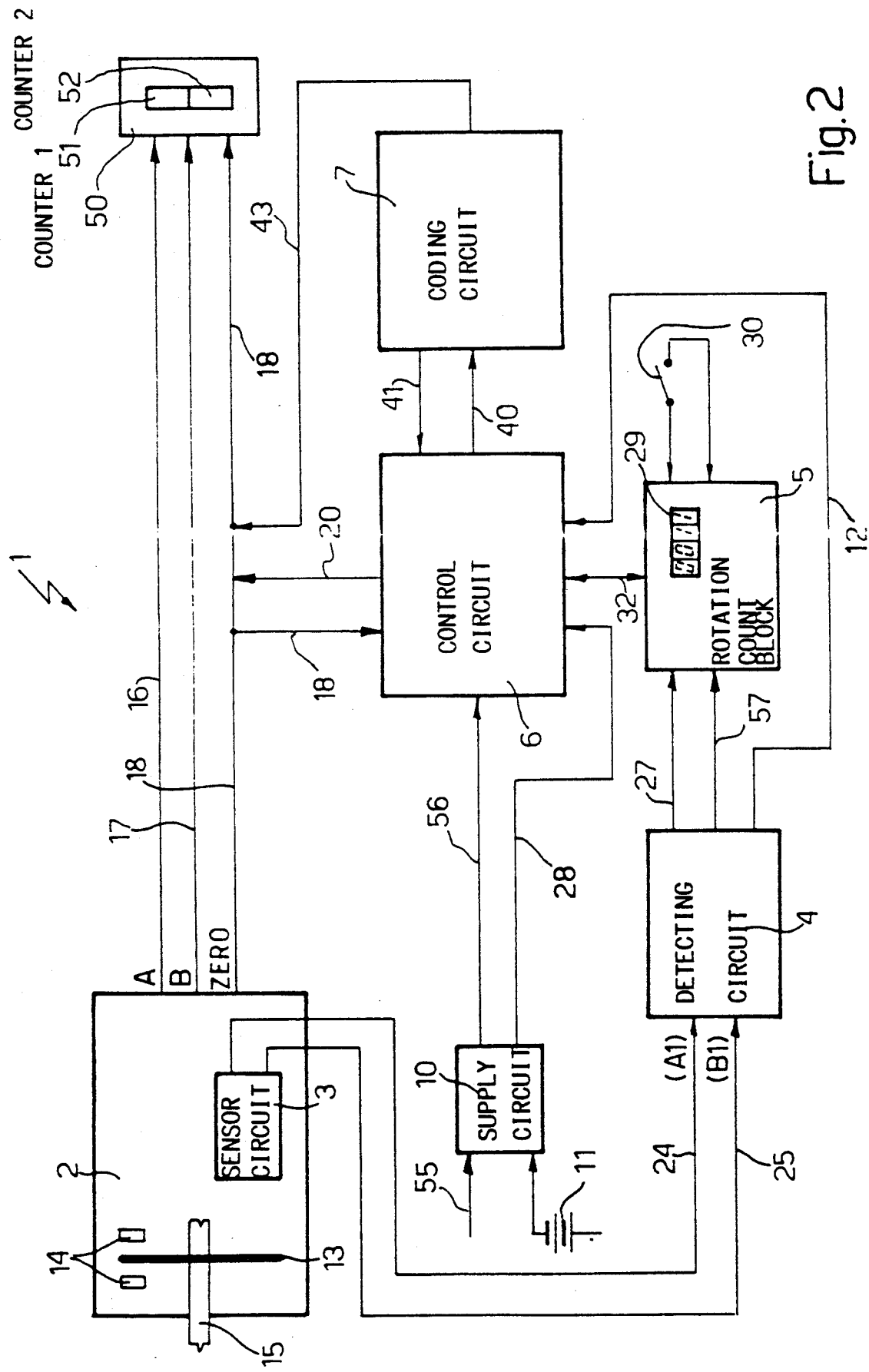
FIG. 2 shows a first variation of the FIG. 1 encoder.

FIG. 2 shows a variation of the FIG. 1 arrangement, in which the component parts of encoder 1 similar to those of FIG. 1 are indicated using the same numbering system. The FIG. 2 arrangement differs as regards connection of control circuit 6 and coding circuit 7, connection of the zero pulse transmission line, and operation of circuits 6 and 7.

In particular, the output of circuit 6 is connected to the input of coding circuit 7 over line 40, and an output of circuit 7 is connected to an input of control circuit 6 over line 41. The count pulses for decoding circuit 50 are transmitted by coding circuit 7 over line 43, while the dummy zero pulse is transmitted over line 20 between control circuit 6 and line 18. Moreover, lines 16 and 17 are no longer connected to control circuit 6.

According to the above first variation of the present invention, when the machine is turned on again, the information stored in memory 29 is transmitted to decoding circuit 50 over lines 43, 16 and 17, with no initial reset procedure required. When the machine is turned on, the axis is moved until the first zero pulse over line 18 enables control circuit 6 and provides for automatically requalifying the axis position.

When the machine is turned on and a zero pulse supplied to control circuit 6, this provides for reading the value stored in memory 29 and indicating the number of turns effected by shaft 15 as of the initial zero position.

The count value in memory 29 is supplied by control circuit 6 over line 40 to coding circuit 7 which, following the zero pulse, supplies a sequence of pulses equal to the number stored in memory 29, or a coded sequence expressing the number stored in memory 29. The information stored in memory 29 is thus transmitted over line 43 to decoding circuit 50 using the same line 18 used for transmitting the zero pulse, with no additional data line required.

Figure 7:
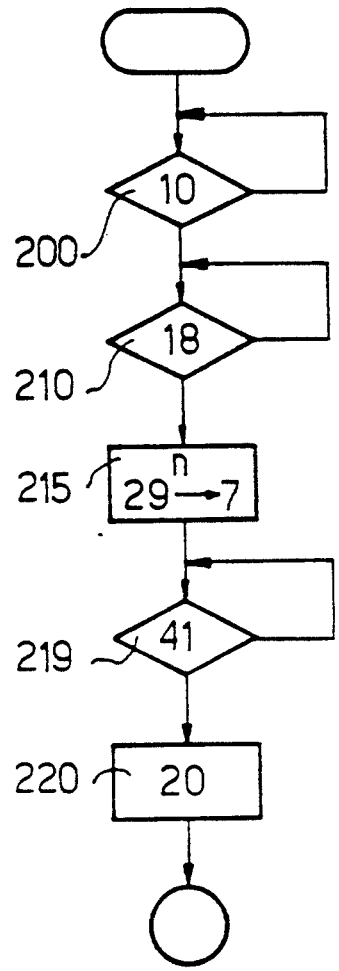

Control circuit 6 operates as shown in the FIG. 7 block diagram. This presents a start block 200, which determines whether power has been supplied to the whole of encoder 1. If it has not, circuit 6 performs a wait cycle. If it has, this is detected by a signal over line 56. Block 200 goes on to wait block 210, which waits for and recognizes a zero pulse over line 18. When the first zero pulse is received by circuit 6, block 210 goes on to block 215, which provides for reading the content (n) of memory 29 and supplying it to coding circuit 7 over line 40. Circuit 7 supplies on to line 18, over line 43, a number of pulses equal to that (n) read in memory 29, after which, it supplies circuit 6 over line 41 with a signal detected via block 219. Block 219 then goes on to block 220, which emits an end-of-transmission (dummy zero) signal, which is sent by control circuit 6 on to line 20 and also provides for disabling circuit 6. Decoding circuit 50 provides for an exact interpretation of the real zero and dummy zero pulses. In particular, circuit 50 counts the n pulses transmitted over line 43 after the real zero pulse, and reconstructs the total number of pulses indicating the exact measurement in relation to the zero reference position according to the formula:

$$Ntot = n*N + n1 \tag{2}$$

where N is the number of pulses transmitted over line 16 or 17 during one complete turn of disk 13, and n1 is the number of pulses transmitted over lines 16 and 17 in the interval in which the n pulses are transmitted over line 43.

Figure 8:
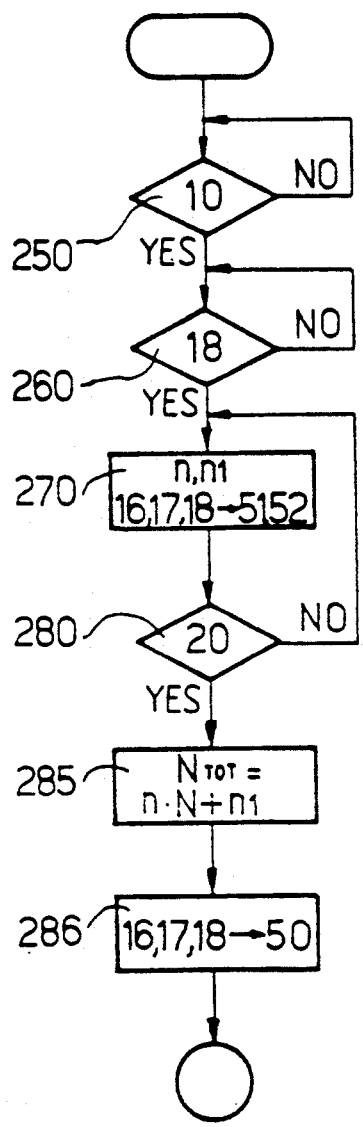

FIG. 8 shows an operating logic block diagram of decoding circuit 50. This presents a start block 250, which waits for a signal indicating that encoder 1 has been turned on. When this occurs, block 250 goes on to block 260, which waits for a zero signal over line 18. When this is detected, block 260 goes on to block 270, which enables counter 51 for counting the (n) pulses transmitted over line 18 by circuit 7, and also provides, via counter 52, for counting the (n1) pulses transmitted over line 16 or 17 during transmission of said (n) pulses following the zero pulse. Block 270 then goes on to block 280, which determines whether the dummy zero pulse is supplied to line 18 by circuit 6 over line 20. When this occurs, block 280 goes on to block 285, which stops counters 51 and 52, and provides for reconstructing the total number of pulses which would have been counted between the mechanical reference position and the position in which the dummy zero pulse is received, according to the formula:

$$Ntot = n*N + n1 \tag{2}$$

Finally, block 285 goes on to block 286 which, as of value Ntot, provides for enabling operation of encoder 1 in the same way as a normal incremental encoder, whereby the signals supplied by incremental encoder 2 over lines 16, 17 and 18 are supplied to decoding circuit 50, which operates in conventional manner as regards the conventional downstream circuits to which it is connected.

Figure 3:
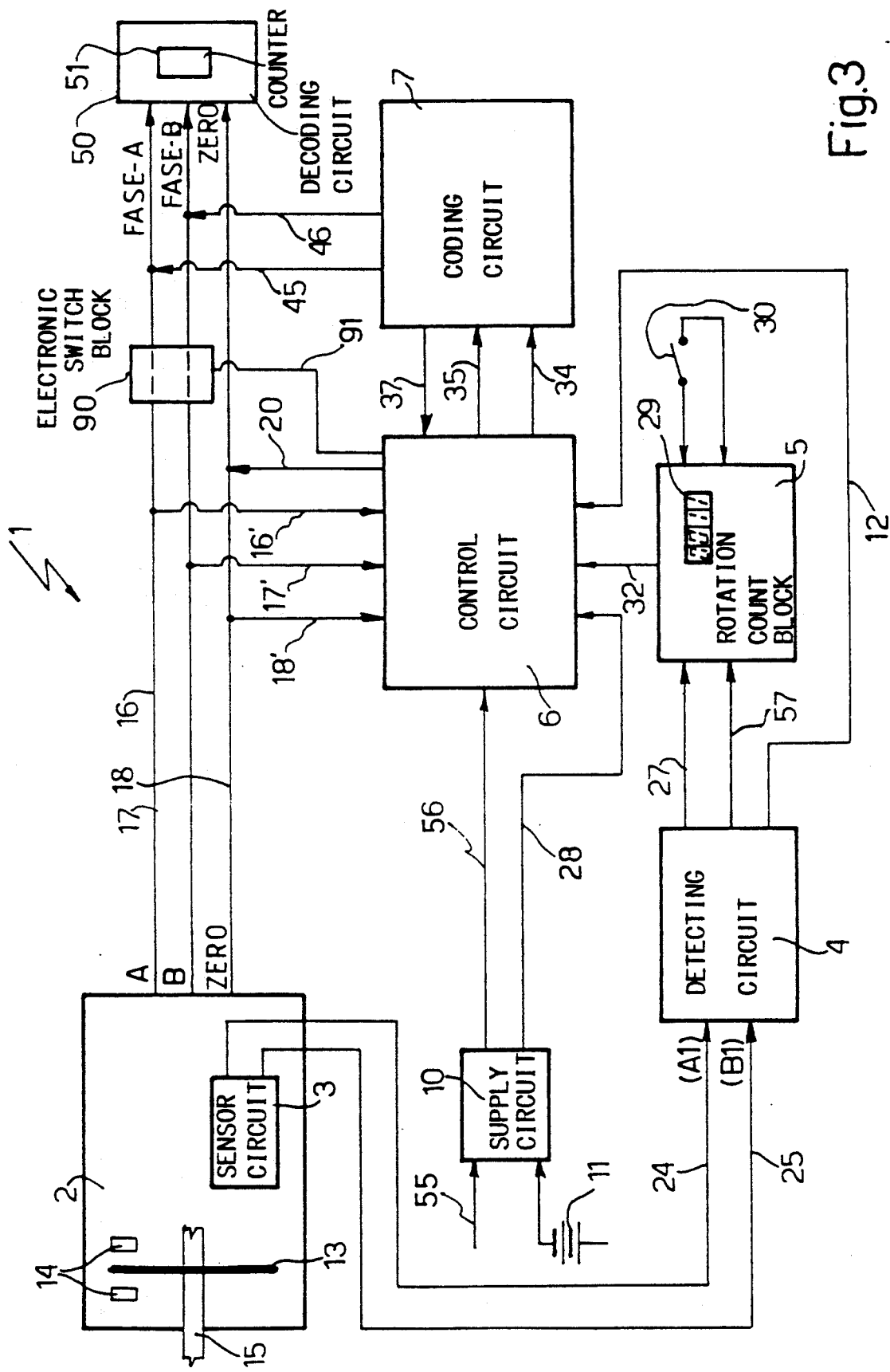
FIG. 3 shows a second variation of the FIG. 1 encoder.

FIG. 3 shows a second variation of the FIG. 1 arrangement, in which the component parts of encoder 1 similar to those in FIG. 1 are indicated using the same numbering system.

The FIG. 3 arrangement differs as regards connection of coding circuit 7 and decoding circuit 50, and operation of coding circuit 7 and control circuit 6. Also, lines 16 and 17 of incremental encoder 2 present an electronic switch block 90 controlled by output signal 91 from control circuit 6.

Upstream from block 90, lines 16, 17 and 18 of incremental encoder 2 present respective branch lines 16', 17' and 18' to control circuit 6, and two lines 45 and 46 from coding circuit 7 are connected respectively to lines 16 and 17 downstream from block 90.

According to the above second variation of the present invention, when the machine is turned on again, the information in memory 29 is transmitted to decoding circuit 50 over lines 16 and 17, with no initial reset procedure required. When the machine is turned on, the axis is moved until the first zero pulse over line 18 enables control circuit 6 and provides for automatically requalifying the axis position.

When the machine is turned on and a zero pulse supplied to control circuit 6, this provides for reading the (n) value in memory 29 indicating the number of turns effected by shaft 15 as of the zero start position, and for disconnecting lines 16 and 17 from decoding circuit 50 via block 90.

Control circuit 6 transfers said (n) number to coding circuit 7, which multiplies it by the N number of pulses per revolution supplied by incremental encoder 2, to give number K. Coding circuit 7 then transmits on to line 45 or 46 (connected respectively to lines 16 and 17) a total number of pulses $Ntot = n*N + K1 = K + K1$, i.e. equal to K plus the number of pulses K1 emitted by incremental encoder 2 and counted by control circuit 6 during transmission of the K pulses. When the total number of pulses Ntot has been transmitted, control circuit 6 emits an end-of-transmission signal over line 20, and reconnects lines 16 and 17 to decoding circuit 50 via signal 91 to block 90, so that, at the end of this phase, control circuit 6 is disabled and encoder 2 operates in the same way as a normal incremental encoder, as described in connection with FIG. 1.

Figure 9:
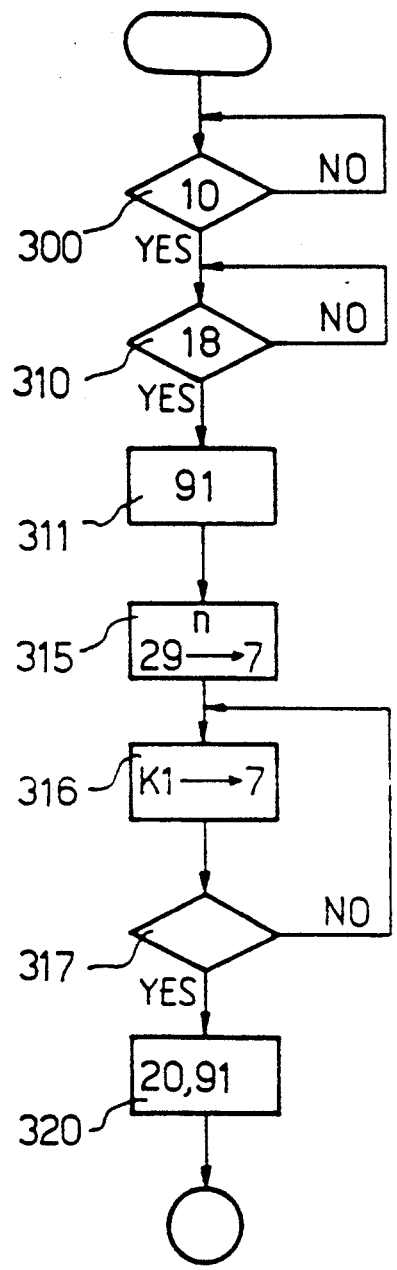

Control circuit 6 operates as shown in the FIG. 9 block diagram. This presents a start block 300, which determines whether power has been supplied to the whole of encoder 1. If it has not, circuit 6 performs a wait cycle. If it has, this is detected by a signal over line 56. Block 300 goes on to wait block 310, which waits for and recognizes a zero pulse over line 18. When the first zero pulse is received by circuit 6, block 310 goes on to block 311, which disconnects block 90 via signal 91 and goes on to block 315, which provides for reading the content (n) of memory 29 and supplying it to coding circuit 7 over line 34. Circuit 7 sends on to line 16 or 17, via lines 45 and 46, a train of pulses (k) equal to the number (n) in memory 29 multiplied by the number of pulses N emitted in one complete turn by encoder 2. Said pulse train is conveniently emitted at a much higher frequency than the pulses generated by incremental encoder 2 and transmitted on to lines 16 and 17. Block 315 goes on to block 316 which, while said pulse train is being emitted by circuit 7, supplies circuit 7 over line 35 with the number of pulses (K1) produced by encoder 2 on line 16 or 17.

When pulses K+K1 have all been transmitted by circuit 7, this supplies a signal over line 37 to block 6. When said signal is detected by block 317, this goes on to block 320 for emitting an end-of-transmission (dummy zero) signal which is sent on to line 20 by control circuit 6; signal 91 is emitted for enabling block 90 and direct transmission from incremental encoder 2 to decoding circuit 50; and control circuit 6 is disabled.

Figure 10:
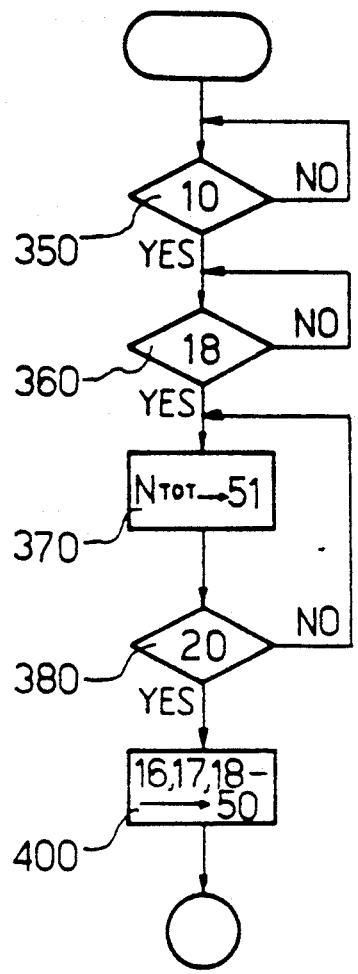

FIG. 10 shows an operating logic block diagram of decoding circuit 50. This presents a start block 350, which waits for a signal indicating that encoder 1 has been turned on. When this occurs, block 350 goes on to block 360, which waits for a zero signal over line 18. When this is detected, block 360 goes on to block 370, which enables counter 51 for counting on line 16 or 17 the (n*N+K1) pulses following the zero pulse and transmitted at high frequency over lines 45 and 46. Block 370 then goes on to block 380, which determines whether the dummy zero pulse is supplied to line 18 by circuit 6 over line 20. When this occurs, block 380 goes on to block 400, which stops counter 51 and, as of count value Ntot, provides for enabling operation of encoder 1 in the same way as a normal incremental encoder, whereby the signals supplied by incremental encoder 2 over lines 16, 17 and 18 are supplied to decoding circuit 50, which operates in conventional manner as regards the conventional downstream circuits to which it is connected.

The electronic circuits added to incremental encoder 2 therefore comprise low-consumption, permanent detecting branch blocks 3, 4 and 5, and blocks 6 and 7 which provide exclusively for transmitting position data at the initial repositioning stage, subsequent to which, absolute encoder 1 operates in exactly the same way as a normal incremental encoder. Consequently, absolute encoder 1 is connected to decoding circuit 50 over the same line as an incremental encoder. The present invention therefore provides for an absolute encoder of relatively straightforward design and little extra cost as compared with an incremental encoder, and which may be applied relatively easily to existing incremental encoders.

To those skilled in the art it will be clear that changes may be made to the present invention as described and illustrated herein without, however, departing from the scope of the same.

For example, changes may be made to control circuit 6 and coding circuit 7, which may be combined into one circuit. Similarly, sensor circuit 3 and detecting circuit 4 may be combined into one circuit having the same characteristics as both when employed separately. Finally, detecting circuit 4 may even be dispensed with.

We claim:

1. A position transducer including an incremental encoder having a coded disk connected stably to a rotary shaft, said incremental encoder supplying at least three output signals: a first signal consisting of a sequence of pulses equal to an elementary angular increment of said shaft, a second signal similar to and out of phase in relation to said first signal for transmitting information relative to the direction of rotation of said shaft, and a third signal consisting of a sequence of zero pulses, each of said zero pulses emitted for each 360 degree rotation of said disk, each of said first, second and third signals being transmitted over a respective first, second and third line; said position transducer comprising:

sensor means connected to said incremental encoder for emitting a fourth signal for each complete turn of said coded disk;

resettable counter means for counting said fourth signal emitted by said sensor means and memorizing the number of turns of said disk in a permanent memory; and first electronic means enabled by the first of said zero pulses generated by said incremental encoder, said first electronic means cooperating with second electronic means for transmitting in coded manner, to means for receiving the position information of said transducer, the information relative to the number of turns contained in said memory, at least one of said first and second electronic means comprising means for generating a coded dummy zero pulse following transmission to said receiving means of said information relative to the number stored in said memory.

2. The transducer as claimed in claim 1, characterized by the fact that said means for receiving said position information comprise means for detecting the first zero pulse generated by said incremental encoder following supply; means for counting and processing said information relative to said number stored in said memory and transmitted by said at least one of said first and second electronic means; means for detecting said dummy zero pulse; and means for continuing reception of information from said first, second and third line of said incremental encoder.

3. The transducer as claimed in claim 1, characterized by the fact that said sensor means comprise a Hall-effect sensor.

4. The transducer as claimed in claim 1, characterized by the fact that said dummy zero pulse is transmitted over the same line as said zero pulse.

5. The transducer as claimed in claim 1 characterized by the fact that said sensor means comprise a magnetic switch (REED).

6. The transducer as claimed in claim 1, characterized by the fact that said encoder is supplied by a supervising and supply circuit connected to an external supply mains, and presents a buffer battery for ensuring supply to parts of said absolute encoder even in the event of power failure.

7. The transducer as claimed in claim 6, characterised by the fact that said supervising and supply circuit provides for determining the charge of said battery and for emitting an error signal in the event said charge falls below a predetermined threshold value.

8. A position transducer including an incremental encoder having a coded disk connected stably to a rotary shaft, said incremental encoder supplying at least three output signals: a first signal consisting of a sequence of pulses equal to an elementary angular increment of said shaft, a second signal similar to and out of phase in relation to said first signal for transmitting information relative to the direction of rotation of said shaft, and a third signal consisting of a sequence of zero pulses, each of said zero pulses emitted for each 360 degree rotation of said disk, each of said first, second and third signals being transmitted over a respective first, second and third line; said position transducer comprising:

sensor means connected to said incremental encoder for emitting a fourth signal for each complete turn of said coded disk;

resettable counter means for counting said fourth signal emitted by said sensor means and memorizing the number of turns of said disk in a permanent memory; and first electronic means enabled by the first of said zero pulses generated by said incremental encoder, said first electronic means cooperating with second electronic means for transmitting in coded manner, to means for receiving the position information of said transducer, the information relative to the number of turns contained in said memory, said at least one of said first and second electronic means comprising means for multiplying said number of turns stored in said memory by said number of pulses per revolution supplied by said incremental encoder to give a second number, said at least one of said first and second electronic means generating a train of pulses equal to said second number plus a number of said pulses generated by said incremental encoder during transmission of said pulse train over said at least one of said first and second line.

9. The transducer as claimed in claim 8, characterized by the fact that said pulses produced by said encoder are transmitted at a first average speed over said first and second lines, said pulse train being transmitted at a second speed, said second speed being greater than said first average speed.

10. A position transducer including an incremental encoder having a coded disk connected stably to a rotary shaft, said incremental encoder supplying at least three output signals: a first signal consisting of a sequence of pulses equal to an elementary angular increment of said shaft, a second signal similar to and out of phase in relation to said first signal for transmitting information relative to the direction of rotation of said shaft, and a third signal consisting of a sequence of zero pulses, each of said zero pulses emitted for each 360 degree rotation of said disk, each of said first, second and third signals being transmitted over a respective first, second and third line; said position transducer comprising:

sensor means connected to said incremental encoder for emitting a fourth signal for each complete turn of said coded disk;

resettable counter means for counting said fourth signal emitted by said sensor means and memorizing the number of turns of said disk in a permanent memory; and first electronic means enabled by the first of said zero pulses generated by said incremental encoder, said first electronic means cooperating with second electronic means for transmitting in coded manner, to means for receiving the position information of said transducer, the information relative to the number of turns contained in said memory, said first electronic means comprises means for detecting said first zero pulse emitted by said incremental encoder subsequent to electrical supply of said transducer, at least one of said first and second electronic means comprising disabling means, said disabling means disabling said at least one of said first and second electronic means in response to said emission of said zero pulse.

11. A position transducer including an incremental encoder having a coded disk connected stably to a rotary shaft, said incremental encoder supplying at least three output signals: a first signal consisting of a sequence of pulses equal to an elementary angular increment of said shaft, a second signal similar to and out of phase in relation to said first signal for transmitting information relative to the direction of rotation of said shaft, and a third signal consisting of a sequence of zero pulses, each of said zero pulses emitted for each 360 degree rotation of said disk, each of said first, second and third signals being transmitted over a respective first, second and third line; said position transducer comprising:

sensor means connected to said incremental encoder for emitting a fourth signal for each complete turn of said coded disk;

resettable counter means for counting said fourth signal emitted by said sensor means and memorizing the number of turns of said disk in a permanent memory; and first electronic means enabled by the first of said zero pulses generated by said incremental encoder, said first electronic means cooperating with second electronic means for transmitting in coded manner, to means for receiving the position information of said transducer, the information relative to the number of turns contained in said memory, at least one of said first and second electronic means comprising means for transmitting a coded dummy zero pulse such that said zero pulse and said dummy zero pulse are separated by a time interval in which a number of said pulses, equal the number stored in said memory of said count means, are transmitted over said at least one of said first and second lines.

12. A position transducer including an incremental encoder having a coded disk connected stably to a rotary shaft, said incremental encoder supplying at least three output signals: a first signal consisting of a sequence of pulses equal to an elementary angular increment of said shaft, a second signal similar to and out of phase in relation to said first signal for transmitting information relative to the direction of rotation of said shaft, and a third signal consisting of a sequence of zero pulses, each of said zero pulses emitted for each 360 degree rotation of said disk, each of said first, second and third signals being transmitted over a respective first, second and third line; said position transducer comprising:

sensor means connected to said incremental encoder for emitting a fourth signal for each complete turn of said coded disk;

resettable counter means for counting said fourth signal emitted by said sensor means and memorizing the number of turns of said disk in a permanent memory; and first electronic means enabled by the first of said zero pulses generated by said incremental encoder, said first electronic means cooperating with second electronic means for transmitting in coded manner, to means for receiving the position information of said transducer, the information relative to the number of turns contained in said memory, at least one of said first and second electronic means comprising means for emitting on said third line, following said zero pulse, a coded pulse sequence expressing said number of turns stored in said memory.

13. A position transducer including an incremental encoder having a coded disk connected stably to a rotary shaft, said incremental encoder supplying at least three output signals: a first signal consisting of a sequence of pulses equal to an elementary angular increment of said shaft, a second signal similar to and out of phase in relation to said first signal for transmitting information relative to the direction of rotation of said shaft, and a third signal consisting of a sequence of zero pulses, each of said zero pulses emitted for each 360 degree rotation of said disk, each of said first, second and third signals being transmitted over a respective first, second and third line; said position transducer comprising:

sensor means connected to said incremental encoder for emitting a fourth signal for each complete turn of said coded disk;

resettable counter means for counting said fourth signal emitted by said sensor means and memorizing the number of turns of said disk in a permanent memory;

a detecting circuit provided between said sensor means and said counter means, said detecting circuit amplifying and clipping said signal from said sensor means;

first electronic means enabled by the first of said zero pulses generated by said incremental encoder, said first electronic means cooperating with second electronic means for transmitting in coded manner, to means for receiving the position information of said transducer, the information relative to the number of turns contained in said memory; and a monitoring device for detecting error conditions in said signals supplied by said sensor means to said detecting circuit, said monitoring device being designed to supply an error signal to said first electronic means.

14. The transducer as claimed in claim 13, characterized by the fact that it comprises a monitoring device for detecting error conditions in the signals supplied by said sensor means to said detecting circuit; said monitoring device being designed to supply an error signal to said first electronic means.

* * * * *